United States Patent [19]

Venzke

[11] Patent Number: 4,804,505

[45] Date of Patent: Feb. 14, 1989

[54] METHOD OF OPERATING A SCREW EXTRUDER AND SCREW EXTRUDERS FOR CARRYING OUT SAID METHODS

[75] Inventor: Wilfried Venzke, Möglingen, Fed. Rep. of Germany

[73] Assignee: Werner & Pfeiderer GmbH, Fed. Rep. of Germany

[21] Appl. No.: 52,683

[22] Filed: May 20, 1987

[30] Foreign Application Priority Data

Jul. 12, 1986 [DE] Fed. Rep. of Germany ....... 3623679

[51] Int. Cl.$^4$ .............................................. B29C 47/92
[52] U.S. Cl. .................................... 264/40.1; 264/40.6; 264/40.7; 366/142; 366/145; 425/143; 425/148
[58] Field of Search ................... 264/40.1, 40.6, 40.7, 264/68, 349; 425/143, 145, 148; 364/469, 473; 366/79, 142, 145

[56] References Cited

U.S. PATENT DOCUMENTS

| | | | |
|---|---|---|---|
| 3,070,836 | 1/1963 | De Haven et al. | 264/40.7 |
| 3,727,892 | 4/1973 | Notte et al. | 366/79 |
| 3,733,059 | 5/1973 | Pettit | 366/79 |
| 4,057,228 | 11/1977 | Volker et al. | 366/79 |
| 4,168,290 | 9/1979 | Giles | 264/40.6 |
| 4,237,082 | 12/1980 | LaSpisa et al. | 264/40.6 |
| 4,309,114 | 1/1982 | Klein et al. | 366/79 |
| 4,550,002 | 10/1985 | Uhland et al. | 264/40.1 |
| 4,671,908 | 6/1987 | Gwinn et al. | 264/40.7 |

FOREIGN PATENT DOCUMENTS

| | | |
|---|---|---|
| 2260768 | 6/1973 | Fed. Rep. of Germany . |
| 3310484 | 7/1984 | Fed. Rep. of Germany . |
| 58-108119 | 6/1983 | Japan ................... 264/40.1 |
| 484094 | 5/1976 | U.S.S.R. ............. 425/145 |
| 805273 | 2/1981 | U.S.S.R. ............. 264/40.6 |

*Primary Examiner*—Jeffery Thurlow
*Assistant Examiner*—Leo B. Tentoni
*Attorney, Agent, or Firm*—Laff, Whitesel, Conte & Saret

[57] ABSTRACT

In a method of operating a screw extruder having a drive motor in which the speed of rotation of the drive motor is controlled, in order to achieve as constant a quality of product as possible, the speed of rotation is controlled depending on the specific energy input in such a manner that the specific energy input is maintained substantially constant. A control depending on the product temperature may advantageously be superimposed on the control keeping the specific energy constant in the form of a cascade control. A screw extruder for carrying out the method has a housing in which a screw is mounted, a drive motor having a variable speed for continuously driving the screw, feed devices for supplying basic products, additives and the like, and a control device for controlling the speed of rotation of the screw. The drive motor is controlled by a device for measuring the driving power of the drive motor and a device for determining the product throughput, a signal corresponding to the quotient of driving power and throughput being fed as an actual value to the control device which has an output connected to the drive motor in order to maintain the specific energy input constant.

2 Claims, 2 Drawing Sheets

METHOD OF OPERATING A SCREW EXTRUDER AND SCREW EXTRUDERS FOR CARRYING OUT SAID METHODS

FIELD OF THE INVENTION

This invention relates to methods of operating screw extruders in which the speed of rotation of the drive motor is controlled and to screw extruders for carrying out such methods.

BACKGROUND OF THE INVENTION

A scew extruder is known from DE-AS No. 22 60 768 in which a control device for a mixer working continuously is described wherein the screw drive motor is controlled depending both on the material temperature and on the mixer torque. In order to avoid overshoot phenomena, a filter is connected in and only the low frequency component of the torque variation is used for the control. A PI controller is used as a control unit. This previously known control principle presupposes a precise temperature measurement for its operability. A twin-screw extruder is known from DE-PS No. 33 10 484 in which a speed control is effected in order to achieve an increase in performance up to the limit of capacity of the extruder. In this case, it is a question of a dual control system in which one closed-loop control "torque-throughput" serves to optimize the throughput while another closed-loop control "material-temperature- speed" serves to adjust the maximum possible discharge temperature. This last-mentioned closed-loop control is actually an auxiliary closed-loop control which renders it possible to set as high a speed as possible so that the resulting reserves of torque can be utilised for a further increase in the throughput. Since the two closed-loop controls mutually influence one another, a decoupling was realized in that the controlling means were allowed to work alternately, at least in the phase of running up to speed.

SUMMARY OF THE INVENTION

The invention is based on recognition of the fact that the product properties resulting during the fusion process in a screw extruder are largely determined by the energy introduced. In order to achieve product properties which remain constant, it is desirable to keep the input energy constant. With regard to the thermal energy supplied, this can be effected by a control of the housing temperature. The mechanical introduction of energy through friction, on the other hand, is conventionally effected without control in that a fixed extruder speed is set or the extruder speed is controlled in accordance with other criteria —as explained above—but not with the object of maintaining the input energy constant. In relatively large screw extruders, in particular, however, the proportion of mechanical energy introduced is dominant.

Starting from this, it is the object of the invention to provide a control for the mechanical introduction of energy in order to keep this constant so as to achieve as uniform a product quality as possible.

According to the invention, this problem is solved by a method of operating a screw extruder in which the speed of rotation of the drive motor of the screw extruder is controlled by controlling the speed of rotation in dependence on the specific energy input in such a manner that this is kept substantially constant.

Preferably, a control depending on the product temperature is superimposed on the energy control in the form of a cascade control.

Another object of the invention is to provide a screw extruder for carrying out the above-described method.

Accordingly, the present invention also provides a screw extruder having a housing in which at least one screw is mounted, a drive motor having a variable speed for continuously driving the screw, feed devices for supplying basic products, additives and the like, and a control device for controlling the speed of rotation of the screw, wherein the drive motor is controlled by a device for measuring the driving power of the drive motor, at least one device for determining the amount of product supplied per unit of time (throughput) and means for feeding a signal corresponding to the quotient of driving power and throughput as an actual value to an input of the said control device, said control device having an output connected to the drive motor to maintain the specific energy input constant.

As a result of this development according to the invention in which the specific energy input is used as a controlled condition, that is to say the driving energy introduced or driving power per throughput, a mode of operation of the screw extruder results which is independent of throughput. In addition, the fundamental advantage is achieved that a constant specific energy input and hence a defined product quality is achieved in constrast to speed controls and speed regulations of a conventional type. Moreover, since the product temperature in screw extruders of the type under consideration is determined very largely by the specific energy input, the control principle according to the invention can be used also with advantage in those systems wherein a measurement of the product temperature is impossible or only possible at relatively great expense. With regard to the mode of operation independent of throughput, it is also to be noted as favourable that the specific energy introduced reacts, as a measured variable, more quickly to variations in throughput than the product temperature for example, so that, in the event of variations in throughput, a more rapid correction is achieved with regard to the product temperature than if the correction of the speed is derived directly from a measurement of the material temperature.

In order to realize the controller action aimed at, the control device preferably comprises a PID control device. Such a PID control device is distinguished by the fact that the manipulated variable corresponds to an addition of the output quantities of a proportional control device, of an integral control device and of a derivative control device (see DIN 19 226). Such a control device can always be used to realize the control principle according to the invention, when, in the working area,there is a substantially proportional relationship between the speed of the drive motor and the specific energy input.

Preferably, the devices for determining the driving power and the throughput are followed by a dividing device. As a result of this dividing device, the quotient of driving power of the drive motor and throughput is formed in order to form the controlled condition in accordance with the specific energy input. The dividing device is desirably followed by a filter device in order to filter out higher frequency signal components and which desirably has a time constant of about 10–40 seconds, preferably about 20 seconds.

The control device is also preferably followed by a filter device to filter out higher frequency signal components and which preferably has a time constant of about 100 seconds. The filter devices achieve the effect that brief disturbances are ignored and in this manner unnecessary correcting movements are avoided. As opposed to this, it is intended to achieve the effect that slow disturbances, such as fluctuations in basic product for example, are corrected. As a result of the dimensioning provided, assurance is provided that even in the event of variations in throughput, the particular new steady-state operating point for the speed is reached sufficiently quickly but without overshooting of the torque.

According to an embodiment of the invention, the extruder has a discharge region in which a product-temperature measuring device is disposed, said device being connected to an input of a temperature control device having an output which is connected to the control device for controlling the speed of the drive motor. As a result of this development, it is possible to superimpose a product temperature in the form of a cascade control on the energy closed-loop control, the desired value of the specific energy input being used as the manipulated variable for the material-temperature closed-loop control. As a result of this, advantages result both in operation and during the starting operation because the energy closed-loop control can be optimized independently of the temperature closed-loop control and is operational on its own. Even in the event of failure of a temperature sensor, the screw extruder can continue to be run without substantially impairing the quality of the product. Thus the superimposed product temperature control works so that the screw extruder is controlled, via the desired value of the specific energy input, in the vicinity of the operating point associated with the desired product temperature and the temperature control device then only corrects the presetting thus selected, in a small working range.

The temperature control device preferably takes the form of a PID device.

BRIEF DESCRIPTION OF THE DRAWINGS

The invention will now be further described, by way of example, with reference to the drawings, in which.

DETAILED DESCRIPTION OF PREFERRED EMBODIMENTS

Figure 1:
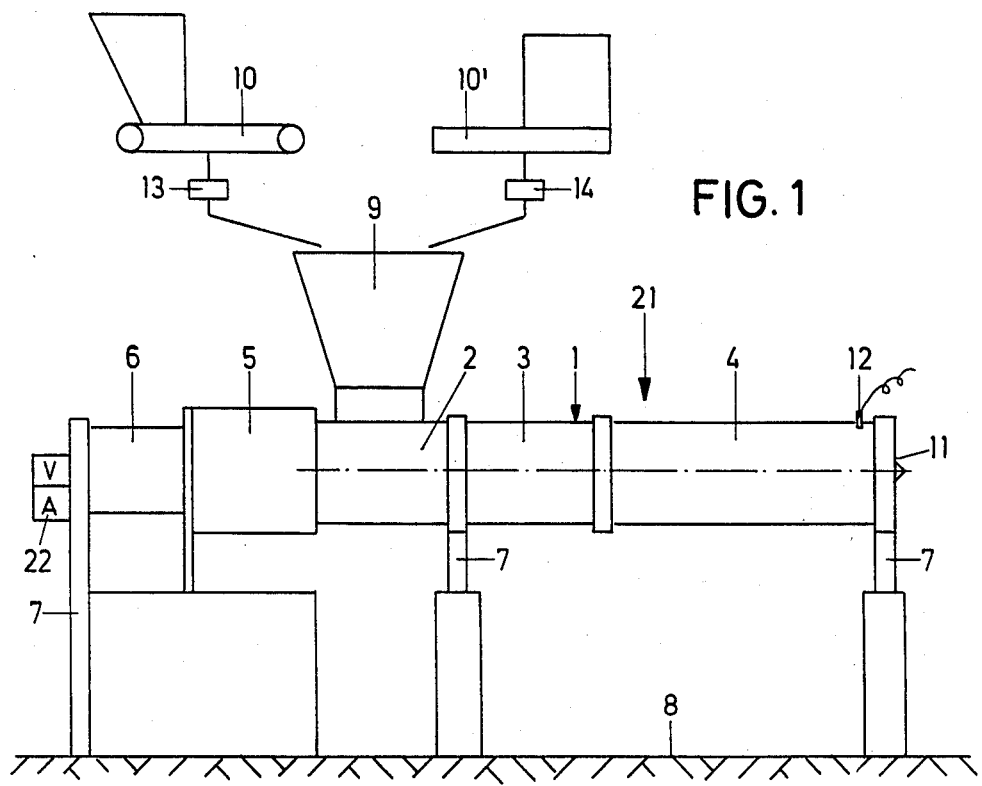
FIG. 1 shows a diagrammatic illustration of a screw extruder of the type according to the invention.

The screw extruder illustrated in FIG. 1 comprises a housing 1 which consists of a plurality of portions 2,3,4 which are arranged axially one behind the other and are flanged together. Mounted in the housing 1 is a screw which is not illustrated in the drawing and which is driven by a motor 6 through a gear 5. The housing 1 and the gear 5 as well as the motor are supported in relation to the ground 8 by means of pillars 7. Opening into the first housing portion 2, serving as a feed zone, is a feed hopper 9 to which material to be processed is supplied, for example via a feed device 10 constructed in the form of a belt weigher, for example for granulated material, and/or a feed device 10' constructed in the form of a metering screw, for example for powder. Provided in the last housing portion 4, shortly before the discharge end 11, is a temperature measuring device 12—only illustrated diagrammatically—which extends into the interior of the housing 1. Associated with the feed devices 10,10' are throughput measuring devices 13,14.

Figure 2:
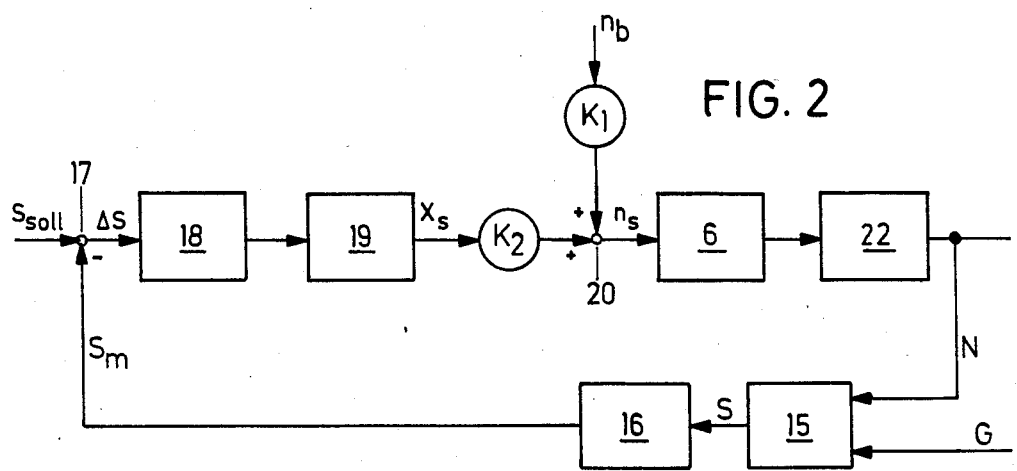
FIG. 2 shows a diagrammatic, block-circuit-diagram-like illustration of a control system according to the invention.

A control system such as can be used according to the invention is illustrated diagrammatically in Figure 2. This system comprises a dividing device 15 to which the driving power N of the drive motor 6, which can be detected by measuring current and voltage in a manner known per se, with measuring devices 22 not illustrated in detail, and the throughput G are supplied as input quantities. The throughput G is determined by the throughput measuring devices 13,14 which are associated with the feed devices 10,10', it being assumed that, in operation, the amount of product supplied corresponds to the amount of product discharged, that is to say the throughput. The mass of product supplied per unit of time is defined as throughput.

The quotient of driving power N and throughput G is determined in the dividing device 15 and by this means a controlled condition S is formed which is fed through a filter 16 to a comparison point 17 of a control device 18. The filter device 16, which is constructed in the form of a low-pass filter, like a filter device 19 which follows the control device 18 and is likewise adapted as a low-pass filter, ensures that higher frequency signal components are filtered out so that only disturbances which change slowly, such as variations in basic product for example, are included in the control. The filter device 19 has a time constant of about 100 seconds and the filter device 16 has a time constant of about 20 seconds.

Apart from the filtered control signal $S_m$, the desired value $S_{soll}$ of the specific energy input is fed to the comparison point 17 which acts as a difference-forming device so that a signal $\Delta S$ corresponding to the difference between the actual value and the desired value is applied to the input of the control device 18.

The output signals of the control device 18, filtered by the filter device 19, is weighted by a factor $K_2$ and is then fed to a further comparison point 20 constructed in the form of an addition device. A basic speed signal $n_b$ weighted by a factor $K_1$ is also fed to this comparison point 20 and an output signal $n_s$ is formed from the sum of these input quantities in accordance with the equation $n_s = K_1 \times n_b + K_2 \times X_s$ and supplied to the drive motor 6 which drives the extruder illustrated in FIG. 1 and designated as a whole by 21. Thus the quantitiy $n_s$ forms the resulting desired-value speed for the main drive.

A control of the type described above can be used, for example, for the extrusion of plastics materials, for example polyethylene and polyamide. A characteristic value for the energy introduced in relation to the product mass may be 0.1 to 0.3 kWh/kg for example. Depending on the material used, the maximum permissible temperature is about 200° to 280° C. As a result of maintaining the specific energy introduced constant in accordance with the invention, the temperature, which is essentially determined by this specific energy in apparatuses of the type in question, is also kept constant, that is to say the effect is achieved that the maximum permissible temperature is not exceeded.

Figure 3:
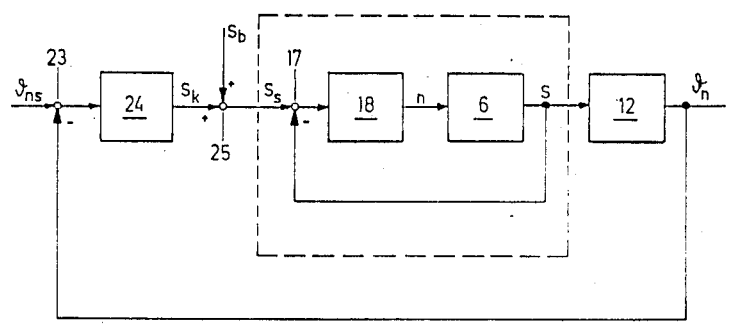
FIG. 3 shows an illustration corresponding to FIG. 2 with superimposed product-temperature control.

In FIG. 3, an embodiment is illustrated in which a temperature control is superimposed in the form of a cascade control on the energy control described above.

In order to simplify the illustration, only the comparison point 17, the control device 18 and the motor 6 are illustrated with regard to the energy closed-loop control in FIG. 3. The product temperature at the discharge end 11 of the extruder 21 is detected through a measuring device 12 which delivers the signal $74_n$. This signal is fed to a comparison point 23, which is constructed in the form of a difference-forming device, together with a temperature desired-value signal $74_n$. The signal formed at the comparison point 23 is fed to the input of a temperature control device 24. At the output of the temperature control device 24, a correction signal $S_k$ for the specific energy input then appears and is fed to a comparison point 25 which is constructed in the form of an adding device. Also fed to this comparison point 25 is a signal $S_b$ which represents the basic desired value for the energy input on which the correction signal $S_k$ is then superimposed forming the resulting desired-value signal $S_s$ which is fed to the comparison point 17 instead of the value $S_{oll}$ in the embodiment shown in FIG. 2. The value for the signal $S_b$ is selected so that the product material reaches an operating point corresponding to the desired material temperature while only a small working range of the presetting selected through the signal $S_b$ is corrected by the control.

The invention is not restricted to the above-described embodiments but modifications and variations may be made without departing from the spirit and scope of the invention.

I claim:

1. A method of operating a screw extruder having a drive motor in which the speed of rotation of the drive motor is controlled, comprising the steps of measuring the driving power of the drive motor, determining the amount of product supplied per unit of time (throughput), feeding a signal corresponding to the quotient of driving power and throughput as an actual value of the specific energy input to an input of a control device, and controlling the speed of rotation of the drive motor in such a manner to maintain the specific energy input constant.

2. A method according to claim 1, including the step of superimposing, in the form of cascade control, a product temperature control on the control which maintains the specific energy input constant.

* * * * *